US012757008B2

(12) United States Patent
Shi et al.

(10) Patent No.: US 12,757,008 B2
(45) Date of Patent: Oct. 6, 2026

(54) USER DATA SYSTEM MANAGEMENT METHOD, COMMUNICATION DEVICE, AND STORAGE MEDIUM

(71) Applicant: ZTE CORPORATION, Shenzhen (CN)

(72) Inventors: Tingxiang Shi, Shenzhen (CN); Lu Zhang, Shenzhen (CN); Fangting Zheng, Shenzhen (CN); Yanwai Fang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 382 days.

(21) Appl. No.: 18/564,188

(22) PCT Filed: Apr. 11, 2022

(86) PCT No.: PCT/CN2022/086153
§ 371 (c)(1),
(2) Date: Nov. 27, 2023

(87) PCT Pub. No.: WO2022/247497
PCT Pub. Date: Dec. 1, 2022

(65) Prior Publication Data

US 2024/0259780 A1 Aug. 1, 2024

(30) Foreign Application Priority Data

May 28, 2021 (CN) ......................... 202110589270.0

(51) Int. Cl.
*H04W 8/18* (2009.01)
*H04W 28/08* (2023.01)

(52) U.S. Cl.
CPC ......... *H04W 8/18* (2013.01); *H04W 28/0925* (2020.05)

(58) Field of Classification Search
CPC ............................ H04W 8/18; H04W 28/0925
See application file for complete search history.

(56) References Cited

U.S. PATENT DOCUMENTS 6,128,644 A 10/2000 Nozaki
2011/0191783 A1 * 8/2011 Le Moal ............... G06F 9/5083 718/105

(Continued)

FOREIGN PATENT DOCUMENTS

CN 101111078 A 1/2008
CN 104754655 A 7/2015
CN 109995844 A 7/2019

(Continued)

OTHER PUBLICATIONS

European Patent Office. Extended European Search Report for EP Application No. 22810230.7, mailed Oct. 21, 2024, pp. 1-8.

(Continued)

*Primary Examiner* — Curtis B Odom
(74) *Attorney, Agent, or Firm* — Vivacqua Crane, PLLC

(57) ABSTRACT

A user data system management method, a communication device, and a storage medium. The user data system management method may include: acquiring a load parameter of each of a plurality of user data systems; and performing allocation processing of user data in the plurality of user data systems according to the load parameter such that the load parameter is less than a load threshold.

19 Claims, 6 Drawing Sheets

(56) References Cited

U.S. PATENT DOCUMENTS

| | | | | |
|---|---|---|---|---|
| 2018/0097875 | A1* | 4/2018 | Zou | H04L 67/1008 |
| 2020/0221361 | A1 | 7/2020 | Bae et al. | |

FOREIGN PATENT DOCUMENTS

| | | | |
|---|---|---|---|
| CN | 109995845 | A | 7/2019 |
| CN | 110536279 | A | 12/2019 |
| CN | 112218334 | A | 1/2021 |
| CN | 112738848 | A | 4/2021 |
| CN | 113038452 | A | 6/2021 |
| EP | 3737069 | A1 | 11/2020 |
| WO | 2019134649 | A1 | 7/2019 |

OTHER PUBLICATIONS

International Searching Authority. International Search Report and Written Opinion for PCT Application No. PCT/CN2022/086153 and English translation, mailed Jun. 15, 2022, pp. 1-11.

The State Intellectual Property Office of People's Republic of China. Decision of Reexamination for CN Application No. 202110589270.0 and English translation, mailed Nov. 29, 2022, pp. 1-23.

The State Intellectual Property Office of People's Republic of China. Decision of Rejection for CN Application No. 202110589270.0 and English translation, mailed Dec. 3, 2021, pp. 1-13.

The State Intellectual Property Office of People's Republic of China. First Office Action for CN Application No. 202110589270.0 and English translation, mailed Jul. 2, 2021, pp. 1-8.

The State Intellectual Property Office of People's Republic of China. First Search Report for CN Application No. 202110589270.0 and English translation, mailed Jun. 22, 2021, pp. 1-5.

The State Intellectual Property Office of People's Republic of China. Notification of Reexamination for CN Application No. 202110589270.0 and English translation, mailed Jul. 27, 2022, pp. 1-19.

The State Intellectual Property Office of People's Republic of China. Second Office Action for CN Application No. 202110589270.0 and English translation, mailed Jul. 2, 2021, pp. 1-12.

The State Intellectual Property Office of People's Republic of China. Supplementary Search Report for CN Application No. 202110589270.0 and English translation, mailed Aug. 4, 2021, pp. 1-4.

The State Intellectual Property Office of People's Republic of China. Third Office Action for CN Application No. 202110589270.0 and English translation, mailed Aug. 10, 2021, pp. 1-12.

* cited by examiner

USER DATA SYSTEM MANAGEMENT METHOD, COMMUNICATION DEVICE, AND STORAGE MEDIUM

CROSS-REFERENCE TO RELATED APPLICATIONS

This application is a national stage filing under 35 U.S.C. § 371 of international application number PCT/CN2022/086153, filed on Apr. 11, 2022, which claims priority to Chinese patent application No. 202110589270.0 filed on May 28, 2021. The contents of these applications are incorporated herein by reference in their entirety.

TECHNICAL FIELD

Embodiments of the present disclosure relate to but are not limited to the communication field, and in particular to a user data system management method, a communication device, and a storage medium.

BACKGROUND

Currently, mobile communications are in the 5G era, which requires the user data systems for 5G networks to support automatic number assignment requirements from not only 5G users but also 2/3/4G users. Taking a VOIP/VOLTE number assignment process as an example, it is mainly implemented through interaction between the user data system and a number assignment proxy server to realize automatic number assignment. However, the existing user data systems involve allocation in units of user number segments. When a user data system corresponding to an account opening number is in an overloaded state, there is a situation where services related to the number cannot be processed, thus leading to the problem of failure to complete number assignment.

SUMMARY

The following is a summary of the subject matters described in detail herein. This summary is not intended to limit the scope of protection of the claims.

Embodiments of the present disclosure provide a user data system management method, a communication device, and a storage medium.

In a first aspect, an embodiment of the present disclosure provides a user data system management method, which may includes: acquiring a load parameter of each of a plurality of user data systems; and performing allocation processing of user data in the plurality of user data systems according to the load parameter such that the load parameter is less than a load threshold.

In a second aspect, an embodiment of the present disclosure further provides a communication device, which may includes: a memory, a processor, and a computer program stored in the memory and executable by the processor, where the computer program, when executed by the processor, causes the processor to perform the user data system management method in the first aspect.

In a third aspect, an embodiment of the present disclosure further provides a computer-readable storage medium storing computer-executable instructions for implementation of the user data system management method in the first aspect.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the claims and the accompanying drawings.

DETAILED DESCRIPTION

In order to make the objectives, technical schemes and advantages of the present disclosure more apparent, the present disclosure is further described in detail with reference to the accompanying drawings and embodiments. It should be understood that the particular embodiments described herein are only intended to explain the present disclosure, and are not intended to limit the present disclosure.

It is to be noted that although a functional module division is shown in a schematic diagram of an apparatus and a logical order is shown in a flowchart, the steps shown or described may be executed, in some cases, with a different module division from that of the apparatus or in a different order from that in the flowchart. The terms such as “first” and “second” in the description, claims or above-mentioned drawings are intended to distinguish between similar objects and are not necessarily to describe a specific order or sequence.

Embodiments of the present disclosure provide a user data system management method, a communication device, and a storage medium. The user data system management method includes, but is not limited to: acquiring a load parameter of each of a plurality of user data systems, and performing allocation processing of user data in the plurality of user data systems according to the load parameter such that the load parameter is less than a load threshold. Since the user data of the existing user data systems are allocated in units of user number segments, when a user data system corresponding to an account opening number is in an overloaded state, services related to the number cannot be processed. In this embodiment, by performing allocation management of user data in the plurality of user data systems based on the load parameter, the plurality of user data systems are all made to be in a state in which the load parameter is less than its load threshold, thereby enabling reduction of the occurrence of a situation where the user data system cannot process number-related services.

The embodiments of the present disclosure will be further explained below with reference to the accompanying drawings.

Figure 1:
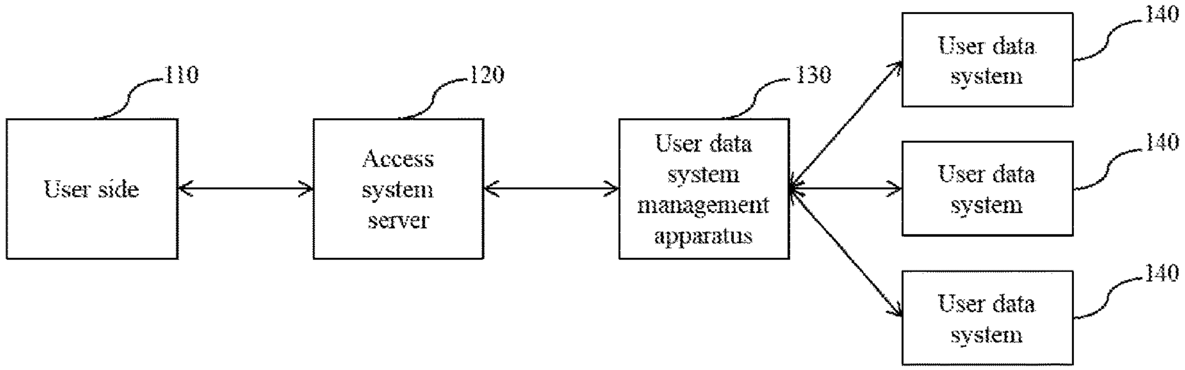
FIG. 1 is a schematic diagram of a system architecture for implementation of a user data system management method according to an embodiment of the present disclosure.

As shown in FIG. 1, FIG. 1 is a schematic diagram of a system architecture platform 100 for implementation of a user data system management method according to an embodiment of the present disclosure.

In the example shown in FIG. 1, the system architecture platform 100 includes a user side 110, an access system server 120, a user data system management apparatus 130, and a user data system 140. Specifically, the user side 110 may be used to connect to the access system server 120 via various networks and perform information interaction with the access system server 120 via the networks, where the user side 110 is capable of acquiring number assignment information required to register with the networks.

It is to be noted that the number assignment information may include a registration server address, and may include a username and password, which is not specifically limited in this embodiment.

It is to be noted that the network may be a mobile communication network or a fixed-line broadband network, which is not specifically limited in this embodiment.

It is to be noted that the user side 110 may include native mobile phone software, and may include third-party mobile phone software, which is not specifically limited in this embodiment.

The access system server 120 is configured to be responsible for the access work of the user side 110, and it is capable of adapting the number assignment information for various types of user sides 110 and is capable of separately interacting with the user data system management apparatus 130 and the user data system 140 so as to realize the automatic number assignment work.

It is to be noted that the access system server 120 may be a number assignment proxy server, a dial-up server, or a user information modification server, which is not specifically limited in this embodiment.

It is to be noted that when the access system server 120 is a number assignment proxy server, in the forwarding mode, as shown in FIG. 1, the access system server 120 does not interact directly with the user data system 140, but rather with the user data system 140 via the user data system management apparatus 130; while in the subscription mode, the access system server 120 may subscribe to the user data system 140 via the user data system management apparatus 130, and after the subscription, the access system server 120 may directly interact with the user data system 140 to which it has subscribed.

The user data system management apparatus 130 is configured to manage a plurality of user data systems 140, and it is capable of performing allocation processing of user data in the plurality of user data systems 140 according to the load condition of the plurality of user data systems 140, thereby ensuring that the user data systems 140 can maintain the state in which the load parameter is less than a load threshold in the process of work.

The user data system 140 has the functions of a user database system of a 2/3/4/5G network. For example, in the scenario of automatic number assignment, the user data system 140 serves as a service side for automatic number assignment and is responsible for user number assignment management.

It is to be noted that the user data system 140 may be a home location register (HLR) in a 2/3G network, may be a home subscriber server (HSS) in a 4G network, may be a unified data management (UDM) in a 5G network, or may be a modular unit for realizing a user database function in a subsequently evolved mobile communication network system, which is not specifically limited in this embodiment.

It is to be understood by those of ordinary skill in the art that the system architecture platform can be applied to a 2G, 3G, 4G, or 5G communication network system, or further evolved mobile communication network systems in the future, etc., which is not specifically limited in this embodiment.

Those of ordinary skill in the art may understand that the system architecture platform shown in FIG. 1 does not constitute a limitation on the embodiments of the present disclosure, and there may be more or fewer components than illustrated, or some of the components may be combined, or a different arrangement of the components may be used.

Based on the system architecture platform, various embodiments of the user data system management method of the present disclosure are provided hereinafter.

Figure 2:
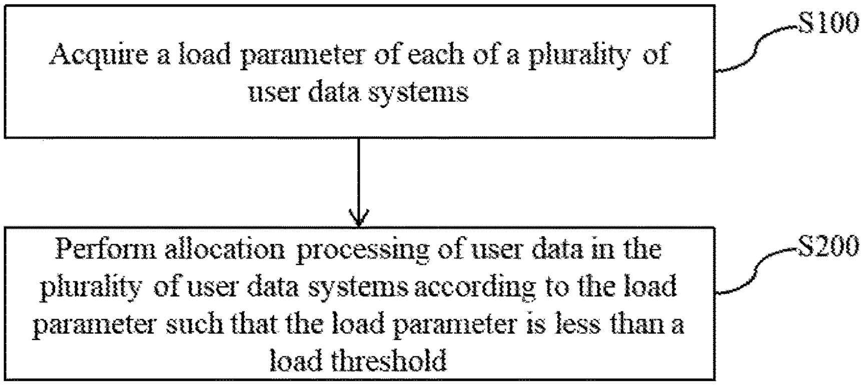
FIG. 2 is a flowchart of a user data system management method according to an embodiment of the present disclosure.

As shown in FIG. 2, FIG. 2 is a flowchart of a user data system management method according to an embodiment of the present disclosure, where the user data system management method applies to a user data system management apparatus, and the user data system management method includes, but is not limited to, steps S100 and S200.

At S100, a load parameter of each of a plurality of user data systems is acquired.

It can be understood that the user data system management apparatus may periodically acquire a load parameter of each of a plurality of user data systems, may acquire a load parameter sent proactively by one or more of the user data systems, and may also acquire a load parameter of a user data system from the plurality of user data systems according to a number service request sent by an access system server. This embodiment does not specifically limit how to acquire the load parameter of each of the plurality of user data systems.

It is to be noted that the scenario of acquiring a load parameter sent proactively from one or more user data systems can be understood as: when one or more user data systems are in an overloaded state, which means that the load parameter is greater than the load threshold, then the one or more user data systems will actively send load parameter information to the user data system management apparatus to notify the user data system management apparatus that it should assist the allocation of the user data, so as to reduce the load parameter.

At S200, allocation processing of user data in the plurality of user data systems is performed according to the load parameter such that the load parameter is less than a load threshold.

It can be understood that when one or more user data systems have a load parameter greater than its load threshold, then user data may be migrated from a user data system with a load parameter greater than its load threshold, and the migrated user data may be migrated into a user data system with a load parameter less than its load threshold, or user data may also be migrated from a user data system with a load parameter greater than its load threshold, and then the migrated user data may be uniformly allocated across other user data systems with a load parameter less than its load threshold. Alternatively, when the load parameters of the plurality of user data systems are all less than their load threshold, then user data in the plurality of user data systems may remain unchanged or the user data in the plurality of user data systems may be subjected to uniform allocation processing. This embodiment does not specifically limit the method for allocation processing of user data in a plurality of user data systems.

Specifically, the user data system management apparatus may acquire a load parameter of each of a plurality of user data systems, and perform allocation processing of user data in the plurality of user data systems according to the load parameter such that the load parameter is less than a load threshold. Since the user data of the existing user data systems are allocated in units of user number segments, when a user data system corresponding to an account opening number is in an overloaded state, services related to the number cannot be processed. In this embodiment, by performing allocation management of user data in the plurality of user data systems based on the load parameter, the plurality of user data systems are all made to be in a state in which the load parameter is less than its load threshold, thereby enabling reduction of the occurrence of a situation where the user data system cannot process number-related services.

In an embodiment, the user data system management method may include the following.

First, for a user data system in a user data system list, the user data system management apparatus regularly initiates a state detection request, the state detection request including a load query and a migration indication, where the load query is used to query the service processing capacity of this user data system and the migration indication is used to indicate migration out or in of the user, that is, it is used to notify this user data system that user data be deleted or preset.

Then, state detection response information returned by the user data system is acquired. In the case of the load query, the service processing capability is returned, for example, load parameter information is returned; in the case of a migration-out indication, user data of the relevant user is returned and deleted; and in the case of a migration-in indication, user data carried in the request message is written to a relevant user database.

Then, state information of the user data system is updated according to the state detection response information, the state information including a correspondence between the updated user data and the user data systems.

Figure 3:
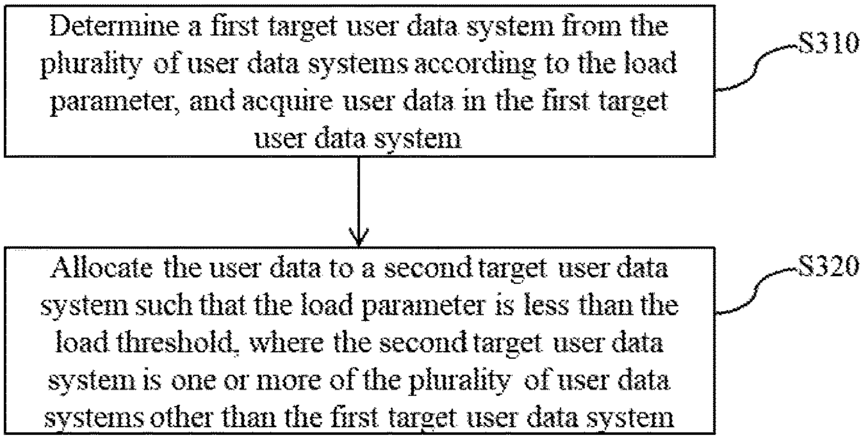
FIG. 3 is a flowchart of a user data allocation method in the user data system management method according to an embodiment of the present disclosure.

Referring to FIG. 3, step S200 includes, but is not limited to, step S310 and step S320.

At S310, a first target user data system is determined from the plurality of user data systems according to the load parameter, and user data in the first target user data system is acquired.

It can be understood that a first target user data system may be determined from the plurality of user data systems according to the load parameters, where the first target user data system may be a user data system with a load parameter greater than the load threshold, and then user data may be acquired from the first target user data system, the user data are migrated out of the first target user data system so as to reduce the load parameter of the first target user data system.

It is to be noted that the first target user data system may also be several user data systems that are ranked higher in terms of the ratio of the load parameter to the load threshold among the plurality of user data systems, and this embodiment does not specifically limit the manner of determining the first target user data system.

It is to be noted that the load threshold may be the same for each user data system, may be different for each user data system, or may be the same for user data systems of the same category and different for user data systems of different categories, and this embodiment does not specifically limit the setting of the load threshold.

At S320, the user data is allocated to a second target user data system such that the load parameter is less than the load threshold, where the second target user data system is one or more of the plurality of user data systems other than the first target user data system.

It can be understood that the user data determined and migrated out from the first target user data system may be allocated to the second target user data system, whereby the service processing burden of the first target data system can be shared by the second target user data system, such that the load parameter of the first target data system is less than the load threshold, thus making it possible to reduce the occurrence of a situation where the user data system cannot process services related to a number.

Specifically, a first target user data system may be determined from the plurality of user data systems according to the load parameters, where the first target user data system may be a user data system with a load parameter greater than the load threshold, and then user data may be acquired from the first target user data system, the user data are migrated out of the first target user data system; then, the user data determined and migrated out from the first target user data system may be allocated to the second target user data system, whereby the service processing burden of the first target data system can be shared by the second target user data system, such that the load parameter of the first target data system is less than the load threshold, thus making it possible to reduce the occurrence of a situation where the user data system cannot process services related to a number.

It is to be noted that the user data migrated out from the first target user data system may be allocated to a certain second target user data system, or the user data migrated out may be equally divided according to the number of the second target user data systems, and then the equally divided user data may be allocated to the second target user data systems, and this embodiment does not specifically limit the manner of allocating the user data.

Figure 4:
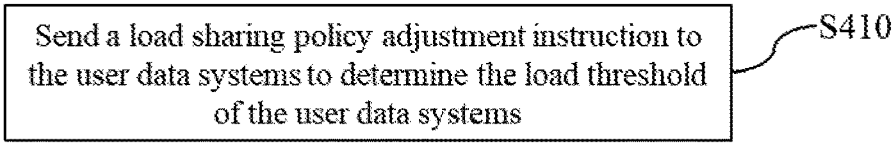
FIG. 4 is a flowchart of a sharing policy adjustment method in the user data system management method according to an embodiment of the present disclosure.

Referring to FIG. 4, step S310 is preceded by, but not limited to, step S410.

At S410, a load sharing policy adjustment instruction is sent to the user data systems to determine the load threshold of the user data systems.

It can be understood that the user data system management apparatus may send load sharing policy adjustment instructions to the user data systems, so that a load threshold of each of the plurality of user data systems can be determined, so as to enable the user data system management apparatus to manage user data in the plurality of user data systems according to the relationship between the load parameters and the load threshold.

It is to be noted that the load sharing policy adjustment instruction may be used for adding or deleting user data systems, may be used for modifying the load threshold of the user data systems, and may be used for modifying the correspondence between the user data systems and the user data, which is not specifically limited in this embodiment.

In an embodiment, the user data system management apparatus may send a load sharing policy adjustment instruction to the user data system to adjust the load threshold of the user data system, and when the adjusted load threshold is less than the load parameter, the load sharing policy adjustment instruction may further include modifying information about the correspondence between the user data systems and the user data, so as to complete the allocation management work of user data in the plurality of user data systems.

Figure 5:
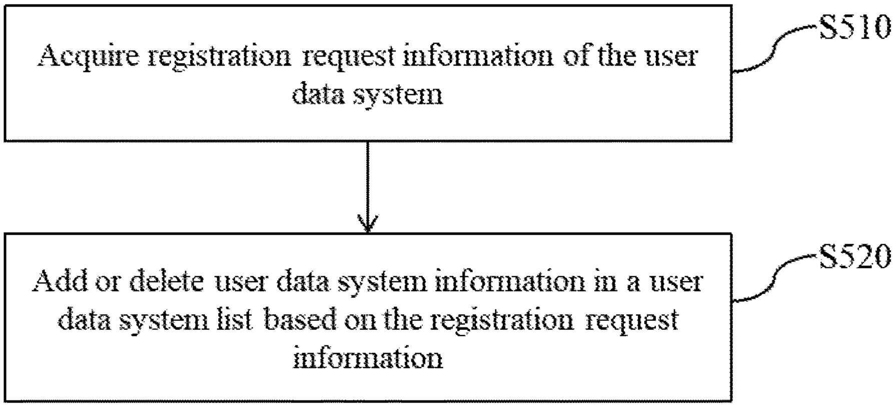
FIG. 5 is a flowchart of registering a user data system in the user data system management method according to an embodiment of the present disclosure.

Referring to FIG. 5, step S100 is preceded by, but not limited to, steps S510 and S520.

At S510, registration request information of the user data system is acquired.

It can be understood that the registration request information may include request information for registering with the user data system management apparatus, and may also include request information for de-registering with the user data system management apparatus.

At S520, user data system information in a user data system list is added or deleted based on the registration request information.

Specifically, a user data system newly accessing the network may send registration request information to the user data system management apparatus, the registration request information being a request for registration in the user data system management apparatus, then the user data system management apparatus may add information about the user data system newly accessing the network to the user data system list according to the registration request information. For a user data system that needs to exit or change the user data system management apparatus, the user data system may send registration request information for requesting de-registration in the user data system management apparatus, then the user data system management apparatus may delete the information about the user data system newly accessing the network in the user data system list according to this registration request information.

It is to be noted that the registration request information may include, in addition to the request information for registration or de-registration, capacity and processing capability information of the user data system, which is not specifically limited in this embodiment.

Figure 6:
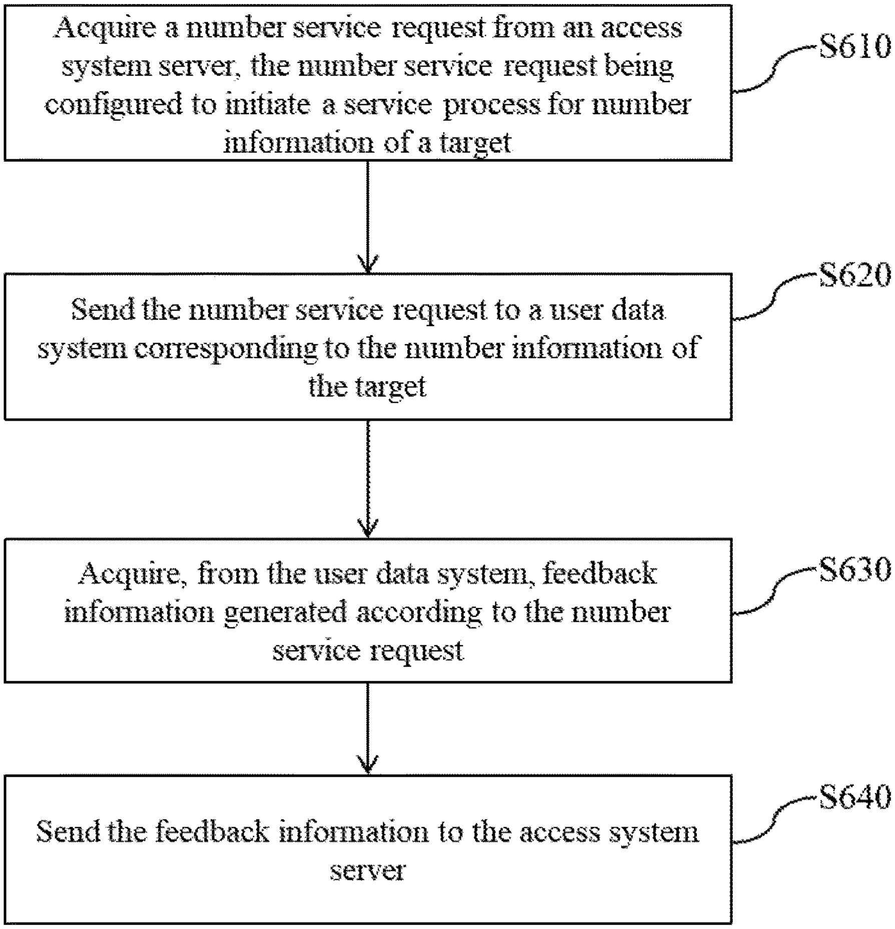
FIG. 6 is a flowchart of a forwarding mode of the user data system management method according to an embodiment of the present disclosure.

Referring to FIG. 6, FIG. 6 is a method of the present disclosure that is applied to a number assignment scenario in a forwarding mode based on the user data system management method of FIGS. 2 to 5. This method further includes, but is not limited to, steps S610, S620, S630, and S640.

At S610, a number service request from an access system server is acquired, the number service request being used to initiate a service process for number information of a target.

It can be understood that the user data system management apparatus may acquire a number service request from an access system server that is used to initiate a service process for number information of a target, where the service process for the number information of the target may be a number assignment service process, a service process for making a telephone call through the number information of the target, a service process for modifying user information in the number information of the target, and this embodiment does not limit the specific service process.

At S620, the number service request is sent to a user data system corresponding to the number information of the target.

It can be understood that, after the user data system management apparatus acquires the number service request from the access system server, it can search for the user data system corresponding to the number information of the target from the correspondence between the user data including the number information and the user data systems that is obtained by means of the user data system management method of FIGS. 2 to 5, and then send the number service request to that user data system.

At S630, feedback information generated according to the number service request is acquired from the user data system.

It can be understood that after the user data system acquires the number service request sent from the user data system management apparatus, it may process and complete the number service for the relevant target according to the number service request and then generate feedback information, where the feedback information is used to provide notification of the completion situation of the service and the feedback information may include information such as the registration server address, and this embodiment does not uniquely limit the information included in the feedback information.

At S640, the feedback information is sent to the access system server.

It can be understood that the user data system management apparatus forwards the feedback information acquired from the user data system to the access system server to notify the access system server that the service for the number information of the target has been completed, thereby enabling the access system server to complete the service process according to the registration server address in the feedback information.

Specifically, the user data system management apparatus may acquire a number service request from an access system server that is used to initiate a service process for number information of a target. After the user data system management apparatus acquires the number service request from the access system server, it can search for the user data system corresponding to the number information of the target through the correspondence between the user data including the number information and the user data systems, and then send the number service request to that user data system. After the user data system acquires the number service request sent from the user data system management apparatus, it may process and complete the number service for the relevant target according to the number service request and then generate feedback information for providing notification of the completion situation of the service. The user data system management apparatus forwards the feedback information acquired from the user data system to the access system server to notify the access system server that the service for the number information of the target has been completed, thereby enabling the access system server to complete the service process according to the registration server address in the feedback information. In this embodiment, the correspondence between the user data including number information and the user data systems is provided such that by performing allocation management of the user data in the plurality of user data systems according to the load parameters, the plurality of user data systems can be all kept in a state in which the load parameter is less than the load threshold, thereby enabling reduction of the occurrence of a situation where the user data system cannot process services related to the number assignment. Moreover, in the scenario of number assignment in the forwarding mode, since the control of the user data systems are all forwarded through the user data system management apparatus, the access system server does not need to locally store data such as the correspondence between the user data including the number information and the user data systems, thereby enabling reduction of the hardware requirements for the access system server.

Figure 7:
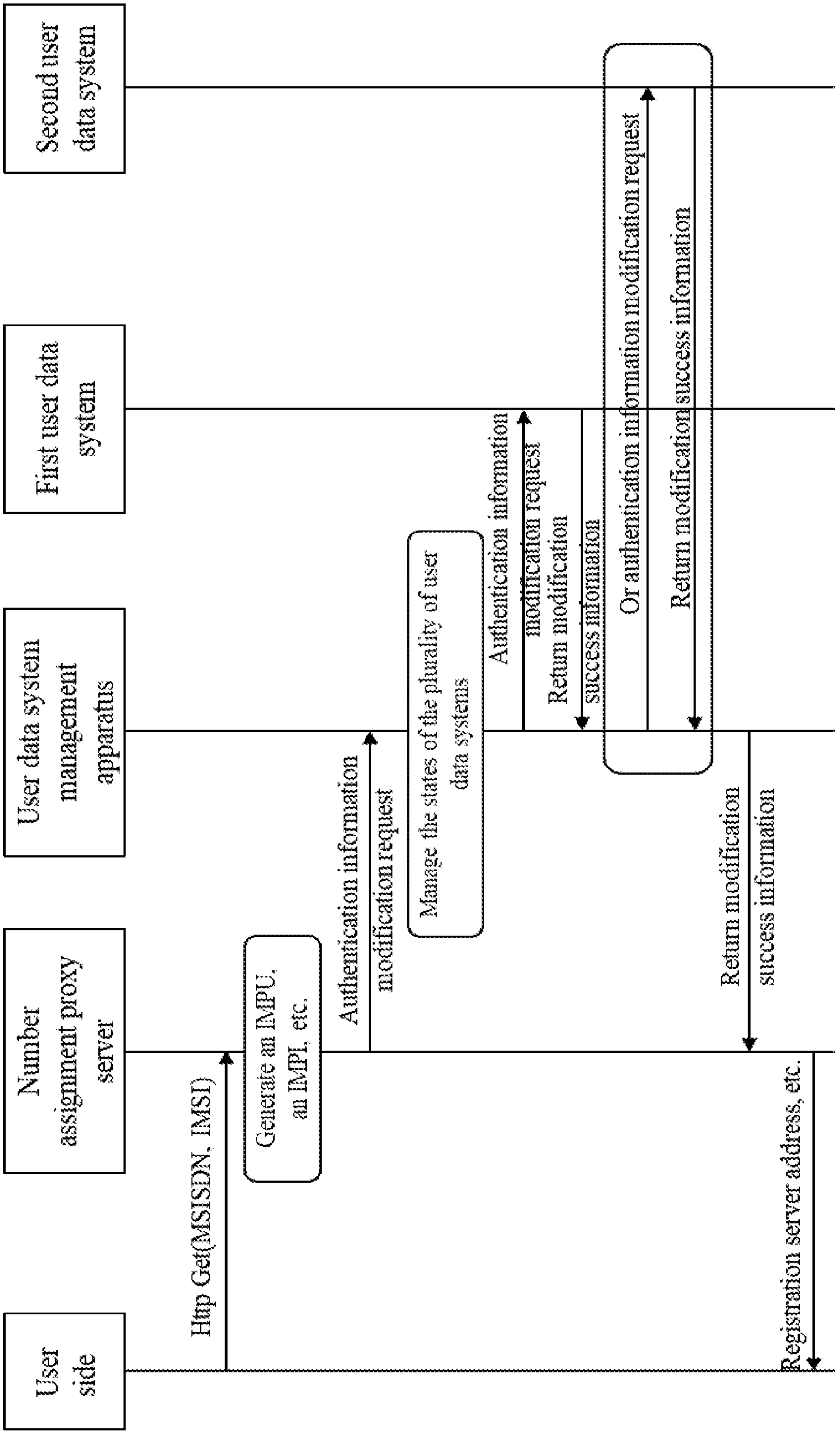
FIG. 7 is a flowchart of a forwarding mode of the user data system management method according to another embodiment of the present disclosure.

In an embodiment, referring to FIG. 7, this embodiment is capable of implementing an automatic number assignment process for load sharing of multiple sets of HLRs without number segmentation, where in a number assignment scenario in the forwarding mode, the automatic number assignment process for a VoIP/VOLTE service that is initiated by the user side is as follows.

The user side initiates a hypertext transfer protocol (HTTP) service process to the number assignment proxy server (access system server), that is, the user side sends an HttpGet message to the number assignment proxy server, where the HttpGet message includes the mobile subscriber international ISDN number (MSISDN) and international mobile subscriber identity (IMSI) that are preset in the subscriber card that is pre-sold by the network operator.

The number assignment proxy server may generate, according to the MSISDN and the IMSI, a public user ID (IMPU) and a private user ID (IMPI), as well as the user name and password required for the user side to register with the network.

The number assignment proxy server sends an authentication information modification request to the user data system management apparatus, the authentication information modification request including information such as the IMPI, the user name and the password.

The user data system management apparatus manages the states of the plurality of user data systems (the plurality of user data systems include a first user data system and a second user data system) to acquire the latest states of the user data systems.

The user data system management apparatus selects a currently available user data system and sends an authentication information modification request to the user data system.

The user data system completes the number assignment service process and returns modification success response information to the number assignment proxy server, where the modification success response information includes, but is not limited to, the registration server address.

The user data system management apparatus returns a modification success response to the number assignment proxy server.

The number assignment proxy server returns a success response, the success response including, but is not limited to, information carrying the registration server address, etc.

Figure 8:
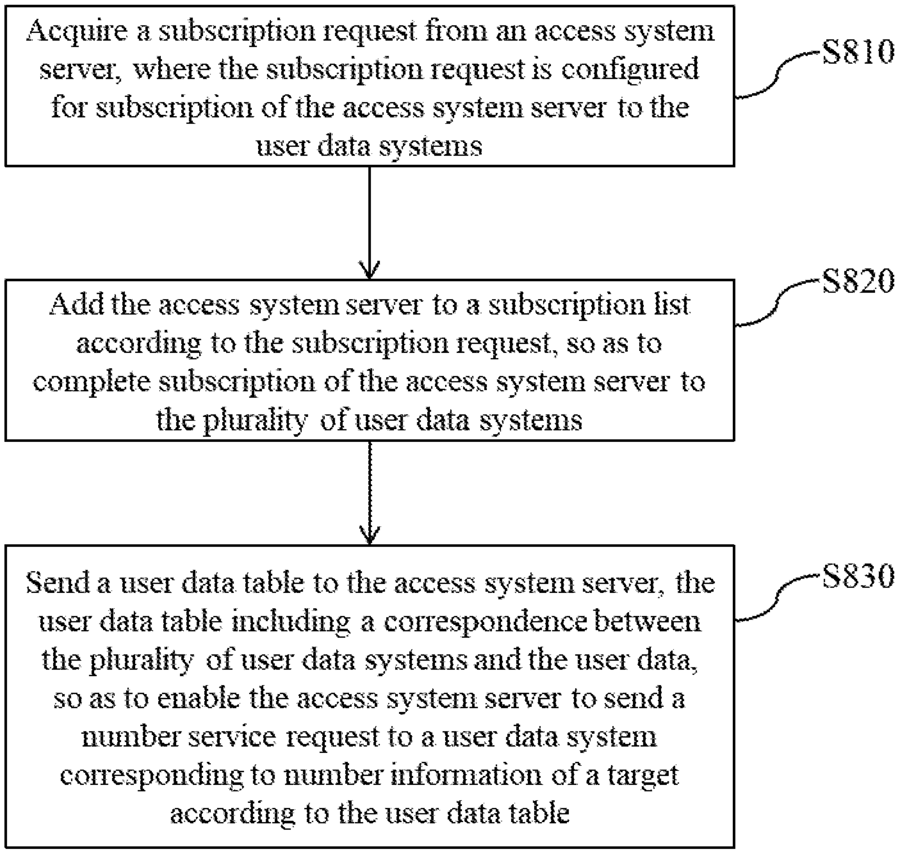
FIG. 8 is a flowchart of a subscription mode of the user data system management method according to an embodiment of the present disclosure.

Referring to FIG. 8, FIG. 8 is a method of the present disclosure that is applied to a number assignment scenario in a subscription mode based on the user data system management method of FIGS. 2 to 5. This method further includes, but is not limited to, steps S810, S820, and S830.

At S810, a subscription request from an access system server is acquired, where the subscription request is used for subscription of the access system server to the user data systems.

It can be understood that the user data system management apparatus may acquire a subscription request from the access system server that is used for subscription of the access system server to the user data systems.

At S820, the access system server is added to a subscription list according to the subscription request, so as to complete subscription of the access system server to the plurality of user data systems.

It can be understood that the user data system management apparatus may add the access system server to the subscription list according to the subscription request, so as to enable the access system server to subscribe to the plurality of user data systems, i.e., to activate the capability of information interaction between the access system server and the user data system.

At S830, a user data table is sent to the access system server, the user data table including a correspondence between the plurality of user data systems and the user data, so as to enable the access system server to send a number service request to a user data system corresponding to number information of a target according to the user data table.

It can be understood that the user data system management apparatus sends a user data table to the access system server according to the subscription request so as to enable the access system server to send a number service request to a user data system corresponding to number information of a target according to the user data table.

It is to be noted that the user data table may include the correspondence between the plurality of user data systems and the user data, and may include a load sharing policy adjustment instruction of the user data system, which is not specifically limited in this embodiment.

It is to be noted that the correspondence between the plurality of user data systems and the user data including the number information is obtained by means of the user data system management method of FIGS. 2 to 5.

Specifically, the user data system management apparatus may acquire a subscription request from the access system server that is used for subscription of the access system server to the user data systems, and then may add the access system server to a subscription list according to the subscription request so as to enable the access system server to subscribe to the plurality of user data systems, and send a user data table to the access system server so as to enable the access system server to send a number service request to a user data system corresponding to number information of a target according to the user data table. In this embodiment, the correspondence between the user data including number information and the user data systems is provided such that by performing allocation management of the user data in the plurality of user data systems according to the load parameters, the plurality of user data systems can be all made to be in a state in which the load parameter is less than the load threshold, thereby enabling reduction of the occurrence of a situation where the user data system cannot process services related to the number assignment. Moreover, in the number assignment scenario in the subscription mode, since the access system server can directly interact with the user data system, the access system server locally stores data such as the correspondence between the user data including the number information and the user data systems, thereby enabling reduction of the risk of a situation in which services related to the number assignment cannot be processed due to a problem with the user data system management apparatus.

Figure 9:
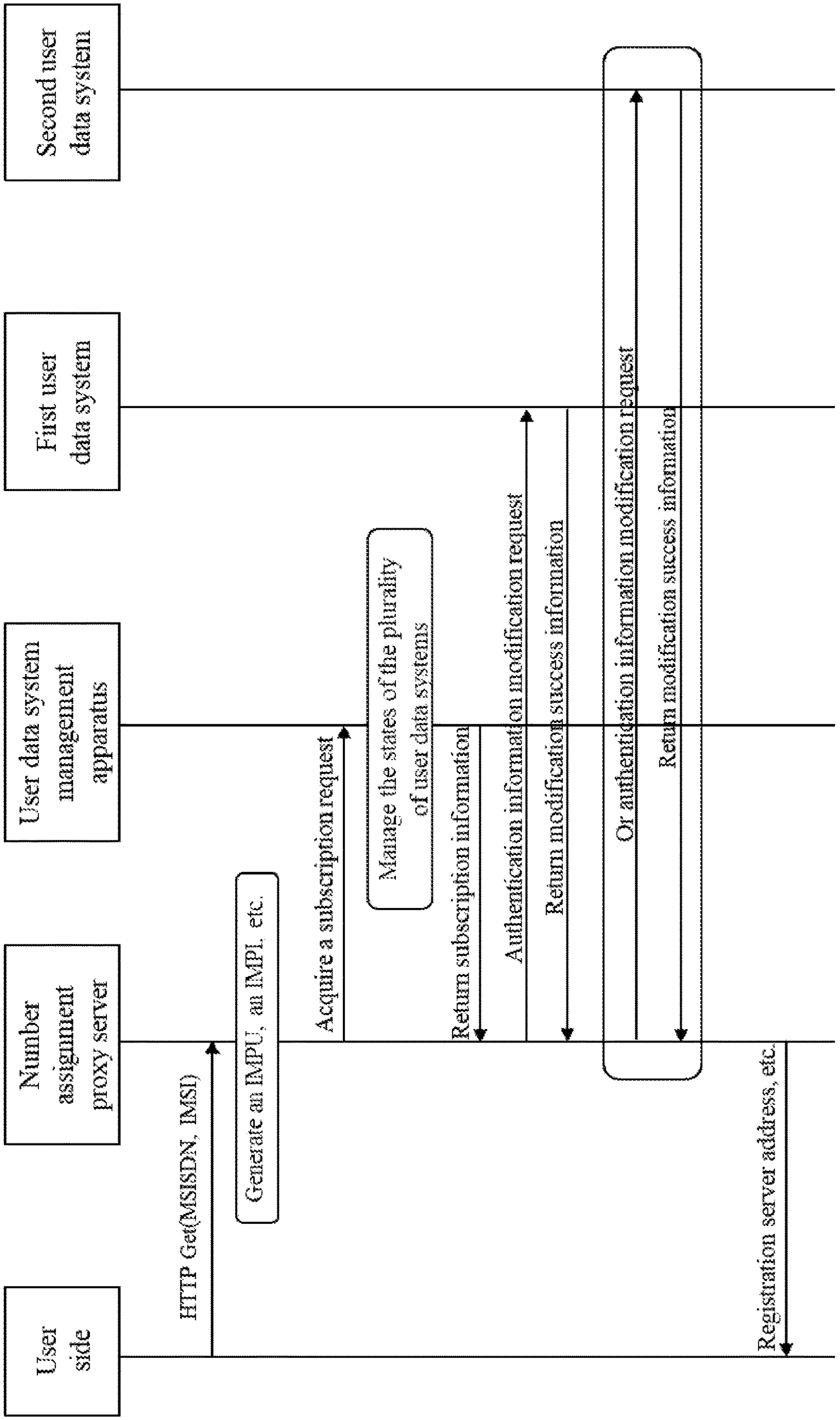
FIG. 9 is a flowchart of a subscription mode of the user data system management method according to another embodiment of the present disclosure.

In an embodiment, referring to FIG. 9, this embodiment is also capable of implementing an automatic number assignment process for load sharing of multiple sets of HLRs without number segmentation, where in a number assignment scenario in the forwarding mode, the automatic number assignment process for a VOIP/VOLTE service that is initiated by the user side is as follows.

The user side initiates an HTTP service process to the number assignment proxy server, where an HttpGet message carries the MSISDN and IMSI numbers preset in the subscriber card pre-sold by the network operator.

The number assignment proxy server generates, according to the MSISDN and IMSI, an IMPU (public user ID) and an IMPI (private user ID), as well as the user name and password required for the user side to register with the network.

If there is no subscription to the user data system, the number assignment proxy server sends to the user data system management apparatus a subscription request to acquire the subscribed user data system.

The user data system management apparatus manages the states of the plurality of user data systems and acquires the latest states of the user data systems, where the latest state includes the latest correspondence between the user data including number information and the user data systems.

The user data system management apparatus returns the information on the subscribed user data system and the load sharing policy adjustment instruction to the number assignment proxy server and adds the number assignment proxy server to the subscription list.

The number assignment proxy server selects a currently available user data system and sends an authentication information modification request to the user data system.

The user data system completes the number assignment service process and returns modification success response information to the number assignment proxy server, where the modification success response information includes, but is not limited to, the registration server address.

The number assignment proxy server returns success response information to the user side, the success response information including, but is not limited to, information such as the registration server address.

Based on the user data system management method described above, various embodiments of the communication device and computer-readable storage medium of the present disclosure are presented below.

Figure 10:
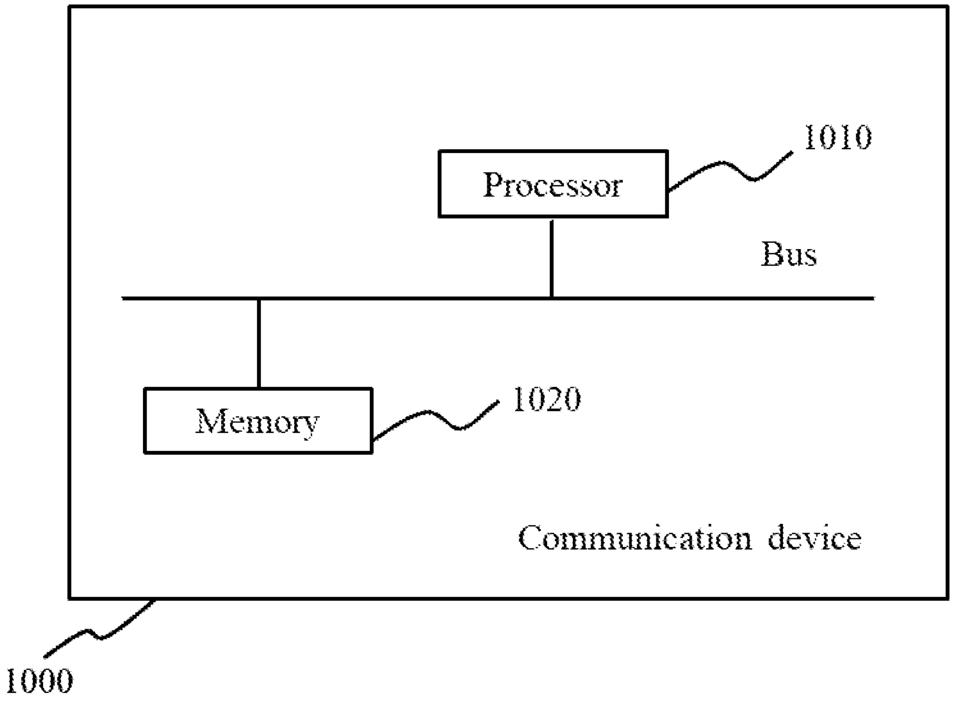
FIG. 10 is a schematic diagram of a communication device according to an embodiment of the present disclosure.

An embodiment of the present disclosure further provides a communication device. With reference to FIG. 10, the communication device 1000 includes a memory 1020, a processor 1010, and a computer program stored in the memory 1020 and executable by the processor 1010.

The processor 1010 and the memory 1020 may be connected by a bus or by other means.

As a non-transitory computer-readable storage medium, the memory 1020 may be configured to store a non-transitory software program and a non-transitory computer-executable program. In addition, the memory 1020 may include a high-speed random access memory and a non-transitory memory, for example, at least one magnetic disk storage device, a flash memory device, or other non-transitory solid-state storage devices. In some implementations, the memory 1020 may include memories remotely located with respect to the processor, and these remote memories may be connected to the processor via a network. Examples of the above-mentioned network include the Internet, an intranet, a local area network, a mobile communication network, and a combination thereof.

Non-transitory software programs and instructions required to implement the user data system management method in the above embodiments are stored in the memory 1020, and when executed by the processor 1010, cause the processor to perform the user data system management method in any of the above embodiments, for example, execute the above-described method steps S100 to S200 in FIGS. 2, S310 to S320 in FIG. 3, S410 in FIGS. 4, S510 to S520 in FIGS. 5, S610 to S640 in FIG. 6, or S810 to S830 in FIG. 8.

Furthermore, an embodiment of the present disclosure further provides a computer-readable storage medium storing computer-executable instructions which, when executed by a processor or controller, for example, by a processor of the communication device in the above embodiment, can cause the processor to perform the user data system management method in any of the above embodiments, for example, to execute the above-described method steps S100 to S200 in FIGS. 2, S310 to S320 in FIG. 3, S410 in FIGS. 4, S510 to S520 in FIGS. 5, S610 to S640 in FIG. 6, or S810 to S830 in FIG. 8.

Embodiments of the present disclosure include: acquiring a load parameter of each of a plurality of user data systems, and performing allocation processing of user data in the plurality of user data systems according to the load parameter such that the load parameter is less than a load threshold. Since the user data of the existing user data systems are allocated in units of user number segments, when a user data system corresponding to an account opening number is in an overloaded state, services related to the number cannot be processed. In the embodiments of the present disclosure, by performing allocation management of user data in the plurality of user data systems based on the load parameter, the plurality of user data systems are all made to be in a state in which the load parameter is less than its load threshold, thereby enabling reduction of the occurrence of a situation where the user data system cannot process number-related services.

It can be understood by those of ordinary skill in the art that all or some of the steps of the methods and systems disclosed above may be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application-specific integrated circuit. Such software may be distributed on computer-readable media, which may include computer-readable storage media (or non-transitory media) and communication media (or transitory media). As well known to those of ordinary skill in the art, the term computer-readable storage medium includes volatile and nonvolatile, removable and non-removable media implemented in any method or technique for storing information, such as computer-readable instructions, data structures, program modules or other data. A computer-readable storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage apparatuses, or any other medium that can be configured to store desired information and can be accessed by a computer. Furthermore, it is well known to those of ordinary skill in the art that communication media typically contain computer-readable instructions, data structures, program modules or other data in a modulated data signal such as a carrier wave or other transmission mechanism, and may include any information transmission media.

The above is a detailed description of some implementations of the present disclosure, but the present disclosure is not limited to the above-mentioned embodiments. Those of ordinary skill in the art can also make various equivalent modifications or replacements without departing from the principle of the present disclosure, and these equivalent modifications or replacements are all included in the scope defined by the claims of the present disclosure.

What is claimed is:

1. A user data system management method, comprising:

acquiring a load parameter of each of a plurality of user data systems; and performing allocation processing of user data in the plurality of user data systems according to the load parameter such that the load parameter is less than a load threshold;

wherein the user data comprises number information, the method further comprising:

acquiring a number service request from an access system server, the number service request being used to initiate a service process for number information of a target;

sending the number service request to a user data system corresponding to the number information of the target;

acquiring, from the user data system, feedback information generated according to the number service request; and sending the feedback information to the access system server.

2. The user data system management method of claim 1, wherein the performing allocation processing of user data in the plurality of user data systems according to the load parameter comprises:

determining a first target user data system from the plurality of user data systems according to the load parameter, and acquiring user data in the first target user data system; and allocating the user data to a second target user data system such that the load parameter is less than the load threshold, wherein the second target user data system is one or more of the plurality of user data systems other than the first target user data system.

3. The user data system management method of claim 2, wherein the determining a first target user data system from the plurality of user data systems according to the load parameter comprises:

determining, from the plurality of user data systems, a user data system corresponding to the load parameter that is greater than the load threshold as the first target user data system.

4. The user data system management method of claim 3, wherein before the determining, from the plurality of user data systems, a user data system corresponding to the load parameter that is greater than the load threshold as the first target user data system, the user data system management method comprises:

sending a load sharing policy adjustment instruction to the user data systems to determine the load threshold of the user data systems.

5. The user data system management method of claim 1, wherein the acquiring a load parameter of each of a plurality of user data systems comprises:

acquiring a load parameter sent proactively by one or more of the user data systems, the load parameter being greater than the load threshold.

6. The user data system management method of claim 1, wherein before the acquiring a load parameter of each of a plurality of user data systems, the user data system management method further comprises:

acquiring registration request information of the user data system; and adding or deleting user data system information in a user data system list based on the registration request information.

7. The user data system management method of claim 1, further comprising:

acquiring a subscription request from the access system server, wherein the subscription request is used for subscription of the access system server to the user data systems;

adding the access system server to a subscription list according to the subscription request, so as to complete subscription of the access system server to the plurality of user data systems; and sending a user data table to the access system server, the user data table comprising a correspondence between the plurality of user data systems and the user data, so as to enable the access system server to send the number service request to the user data system corresponding to the number information of the target according to the user data table.

8. A communication device, comprising: a memory, a processor, and a computer program stored in the memory and executable by the processor, wherein the computer program, when executed by the processor, causes the processor to perform a user data system management method comprising:

acquiring a load parameter of each of a plurality of user data systems; and performing allocation processing of user data in the plurality of user data systems according to the load parameter such that the load parameter is less than a load threshold;

wherein the user data comprises number information, the method further comprising:

acquiring a number service request from an access system server, the number service request being used to initiate a service process for number information of a target;

sending the number service request to a user data system corresponding to the number information of the target;

acquiring, from the user data system, feedback information generated according to the number service request; and sending the feedback information to the access system server.

9. The communication device of claim 8, wherein the performing allocation processing of user data in the plurality of user data systems according to the load parameter comprises:

determining a first target user data system from the plurality of user data systems according to the load parameter, and acquiring user data in the first target user data system; and allocating the user data to a second target user data system such that the load parameter is less than the load threshold, wherein the second target user data system is one or more of the plurality of user data systems other than the first target user data system.

10. The communication device of claim 9, wherein the determining a first target user data system from the plurality of user data systems according to the load parameter comprises:

determining, from the plurality of user data systems, a user data system corresponding to the load parameter that is greater than the load threshold as the first target user data system.

11. The communication device of claim 10, wherein before the determining, from the plurality of user data systems, a user data system corresponding to the load parameter that is greater than the load threshold as the first target user data system, the user data system management method comprises:

sending a load sharing policy adjustment instruction to the user data systems to determine the load threshold of the user data systems.

12. The communication device of claim 8, wherein the acquiring a load parameter of each of a plurality of user data systems comprises:

acquiring a load parameter sent proactively by one or more of the user data systems, the load parameter being greater than the load threshold.

13. The communication device of claim 8, wherein before the acquiring a load parameter of each of a plurality of user data systems, the user data system management method further comprises:

acquiring registration request information of the user data system; and adding or deleting user data system information in a user data system list based on the registration request information.

14. A non-transitory computer-readable storage medium, storing computer-executable instructions for implementation of a user data system management method comprising:

acquiring a load parameter of each of a plurality of user data systems; and performing allocation processing of user data in the plurality of user data systems according to the load parameter such that the load parameter is less than a load threshold;

wherein the user data comprises number information, the method further comprising:

acquiring a number service request from an access system server, the number service request being used to initiate a service process for number information of a target;

sending the number service request to a user data system corresponding to the number information of the target;

acquiring, from the user data system, feedback information generated according to the number service request; and sending the feedback information to the access system server.

15. The non-transitory computer-readable storage medium of claim 14, wherein the performing allocation processing of user data in the plurality of user data systems according to the load parameter comprises:

determining a first target user data system from the plurality of user data systems according to the load parameter, and acquiring user data in the first target user data system; and allocating the user data to a second target user data system such that the load parameter is less than the load threshold, wherein the second target user data system is one or more of the plurality of user data systems other than the first target user data system.

16. The non-transitory computer-readable storage medium of claim 15, wherein the determining a first target user data system from the plurality of user data systems according to the load parameter comprises:

determining, from the plurality of user data systems, a user data system corresponding to the load parameter that is greater than the load threshold as the first target user data system.

17. The non-transitory computer-readable storage medium of claim 16, wherein before the determining, from the plurality of user data systems, a user data system corresponding to the load parameter that is greater than the load threshold as the first target user data system, the user data system management method comprises:

sending a load sharing policy adjustment instruction to the user data systems to determine the load threshold of the user data systems.

18. The non-transitory computer-readable storage medium of claim 14, wherein the acquiring a load parameter of each of a plurality of user data systems comprises:

acquiring a load parameter sent proactively by one or more of the user data systems, the load parameter being greater than the load threshold.

19. The non-transitory computer-readable storage medium of claim 14, wherein before the acquiring a load parameter of each of a plurality of user data systems, the user data system management method further comprises:

acquiring registration request information of the user data system; and adding or deleting user data system information in a user data system list based on the registration request information.

* * * * *